June 10, 1969     HANS-JOACHIM WINKLER     3,448,832
STEP-UP GEAR DYNAMOMETER BRAKE UNIT
Filed April 27, 1966

Hans-Joachim Winkler.

3,448,832
STEP-UP GEAR DYNAMOMETER BRAKE UNIT
Hans-Joachim Winkler, 6750 Kaiserslautern, Morlauterestrasse 27, Rhineland-Palatinate, Germany
Filed Apr. 27, 1966, Ser. No. 547,091
Int. Cl. F16d *57/02, 57/00;* F16h *3/44*
U.S. Cl. 188—90                                                             5 Claims

ABSTRACT OF THE DISCLOSURE

A brake which may be utilized as a dynamometer incorporates a planetary gear set which provides alternate connections to the brake rotor at differing ratios.

---

To determine the power at low rates of revolution of the engine in question, brakes are in use, which are driven over a coaxial step-up gear. Thus the rate of revolution of the brake is enlarged and the size of the brake can be kept small. The gear housing is rigidly connected to the stator of the brake. Both are mounted on a pivoted frame. Thus the mechanical losses of energy are included in the amount indicated by the meter and the indicated value of the torque is fully correct.

Sometimes gear units with changeable ratios are used. In this way the same brake may be easily adjusted to different given conditions.

The unduly large size of gear units having changeable ratios is very disadvantageous.

It is suggested to use a planetary gear. The free end of the brake shaft penetrates centrally the hollow cage, which is the planet carrier.

The inner diameter of the protruding hub of the cage is to be considerably larger than the diameter of the end of the brake shaft placed centrally in it.

Further it is suggested to design the cage in such a way, that it may be easily demounted axially together with the planets.

Two advantages are thus combined.

(a) The axial dimensions of the whole set can be kept to a minimum.

(b) Two different ratios are available.

Figure 1:
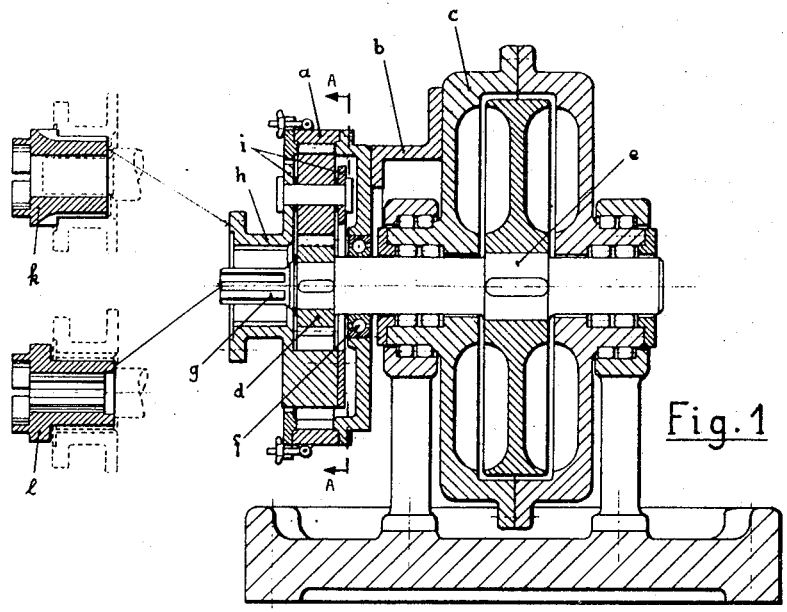
FIG. 1 shows the axial section through the mechanism suggested in connection to a hydraulic brake.
Figures 2, 3:
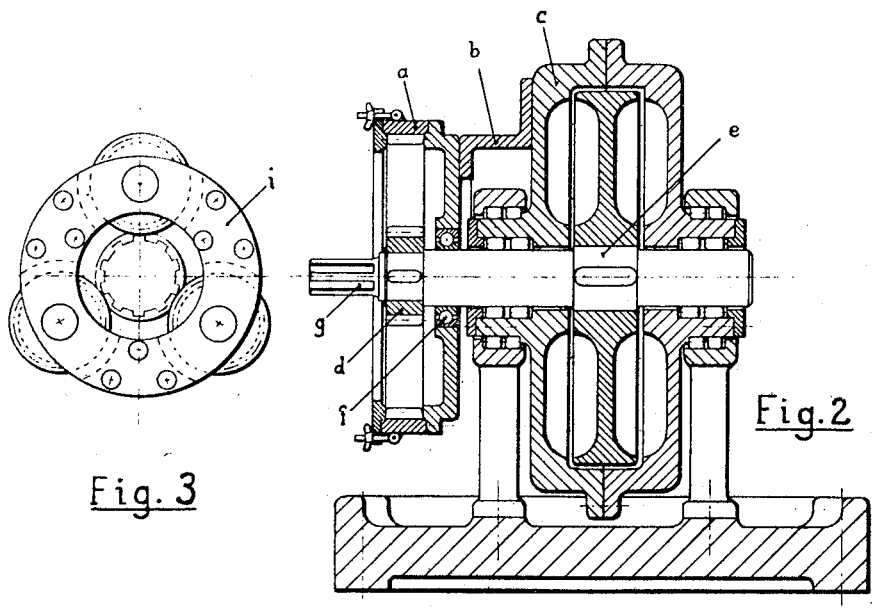
FIG. 2 shows the whole mechanism where cage and planets are removed.
FIG. 3 shows the cage with the planets, separately, in the view indicated by A—A in FIG. 1.

A housing $a$ with interior toothing is rigidly connected by an intermediate part $b$ (extending round no more than about 180°–270°) to the stator $c$ of a hydraulic brake. This stator $c$ is supported by bearings and may follow a torque within a certain angle, according to the conventional designs. The sun wheel $d$ of the planetary gear is fixed on the brake shaft $e$.

In order to increase the accuracy of the centering the housing $a$ is additionally centered with the brake shaft $e$ by means of a bearing $f$.

The keywayed end $g$ of the brake shaft $e$ appears within the protruding hub $h$ of the cage $i$. The two interchangeable driving flanges $k$ or $l$ respectively may be inserted thereupon. The flange $k$ keys into the keyways of the hub $h$, the flange $l$, on the contrary, keys onto the keywayed end $g$ of the brake shaft $e$. Thus the tangential force of the larger torque is transmitted at a larger radius, which is most reasonable. In addition the hub $h$ of the cage $i$ may be given the represented shape with a flange at its edge for the purpose of a second manner of connecting the drive to the cage.

The cage $i$, which is the planet carrier, is not supported by any bearings at all but is centered merely by the toothing of the planets. This simplification offers the considerable advantage of a particularly easy way of demounting it.

In the range of low rates of revolution and correspondingly strong torque the brake is driven over the planetary gearing by connecting the driving engine to the hub of the cage by means of the flange element $k$.

In the range of high rates of revolution a direct connection between the driving engine and the brake shaft shall be established by means of the flange element $l$ which will connect the drive directly to the brake shaft.

In order to prevent noises in the case of very large rates of revolution in cage $i$ in unit with its planets shall be taken off, while the housing $a$ of the planetary gear with the interior toothing as well as the sun wheel on the brake shaft need not be demounted.

The driving gear suggested in this specification need not be connected necessarily to a hydraulic brake. It offers the same advantages, explained above, if any other type of a mechanical or electrical brake is used.

I claim:

1. A dynamometer brake device, comprising a coaxially arranged planetary gearset and a rotary power absorbing brake, said brake having a rotor and a stator, a central brake shaft unitarily connected to the sun of the planetary gearset and to the rotor of the brake, the stator of said brake being unitarily connected to the ring gear of the planetary gearset, said brake shaft having external splines on the end of the brake shaft opposite the brake and adjacent the planetary gearset, the planet carrier of said gearset having an internally splined hub surrounding and being radially spaced from said splines on said brake shaft, and means to selectively drive the brake directly through the brake shaft, or through the planet carrier by engaging said internal or external splines, respectively.

2. The device of claim 1 in which said stator and said ring gear are supported in bearings for limited rotation.

3. The device of claim 1 in which the means to drive the brake comprises two coupling elements, one of which is splined internally but not externally, said element being operable to drive only the brake shaft, the other element being splined externally but not internally, said other element being operable to drive only the planet carrier.

4. The device of claim 3 in which the ring gear is formed on the interior periphery of a cylindrical housing member, said housing member surrounding but not enclosing the planet gears, and in which the planet carrier is supported and is centered in radial direction merely by teeth of its planets, a disc means having an outer diameter substantially equal to the diameter of said ring gear, said disc means being removably connected with said housing member to provide both a complete enclosure and an easy removal of said planet carrier.

5. The device of claim 4 in which said disc means is fastened to said housing member by fastening means arranged around the outermost periphery of said housing member, said fastening means being operative to facilitate removal of said planet carrier when said brake is to be driven by said external splines on said brake shaft.

References Cited

UNITED STATES PATENTS

| 1,249,261 | 12/1917 | Walker. | |
|---|---|---|---|
| 2,421,056 | 5/1947 | Dake. | |
| 2,645,136 | 7/1953 | Neal | 74—688 |

FOREIGN PATENTS

| 647,150 | 11/1928 | France. |
|---|---|---|
| 884,562 | 12/1961 | Great Britain. |
| 965,189 | 7/1964 | Great Britain. |

DONLEY J. STOCKING, *Primary Examiner.*

THOMAS C. PERRY, *Assistant Examiner.*

U.S. Cl. X.R.

74—750, 801; 73—136